United States Patent [19]
Field et al.

[11] Patent Number: 6,138,735
[45] Date of Patent: Oct. 31, 2000

[54] HAND TOOL FOR APPLYING ADHESIVE STRIP MATERIAL

[75] Inventors: Stephen Field; Raymond Pek, both of Ottawa, Canada

[73] Assignee: Edgetech I.G., Ltd, Ontario, Canada

[21] Appl. No.: 09/041,670

[22] Filed: Mar. 13, 1998

[30] Foreign Application Priority Data

Mar. 14, 1997 [CA] Canada .................................. 2200024

[51] Int. Cl.⁷ ........................ B32B 31/00; B26B 27/00; B26D 3/00
[52] U.S. Cl. ........................ 156/468; 156/486; 156/523; 156/574; 156/579; 156/101; 156/102; 156/106; 156/109; 156/211; 156/213
[58] Field of Search ................................ 156/468, 486, 156/513, 523, 574, 579, 199, 211, 213, 257, 101, 102, 106, 109

[56] References Cited

U.S. PATENT DOCUMENTS

| | | | |
|---|---|---|---|
| Re. 35,291 | 7/1996 | Lafond | 156/109 |
| 4,756,789 | 7/1988 | Kolff | 156/391 |
| 4,831,799 | 5/1989 | Glover et al. | 52/172 |
| 5,013,377 | 5/1991 | Lafond | 156/109 |
| 5,472,558 | 12/1995 | Lafond | 156/523 |
| 5,865,942 | 2/1999 | Sinclair | 156/499 |

OTHER PUBLICATIONS

Edgetech Newsletter vol. 1 No. 2 Winter 1990, 2 pages.
Edgetech Newsletter vol. 2 No. 1 Fall 1991, 2 pages.

*Primary Examiner*—Linda L. Gray
*Attorney, Agent, or Firm*—Wenderoth, Lind & Ponack, L.L.P.

[57] ABSTRACT

A hand tool for applying adhesive strip material to a glass sheet has a manually graspable body with a channel extending through it to receive the strip material. A positioning member adjacent the channel guides the tool along the edge of the glass sheet. The body includes a punch selectively operable to notch the strip material to facilitate corner formation, and a cutter selectively operable to sever the strip when application of the strip to the glass sheet has been completed. Actuators for the punch and for the cutter are accessible on the exterior surface of the hand tool in locations where they can be operated by the user in a number of different holding positions.

17 Claims, 8 Drawing Sheets

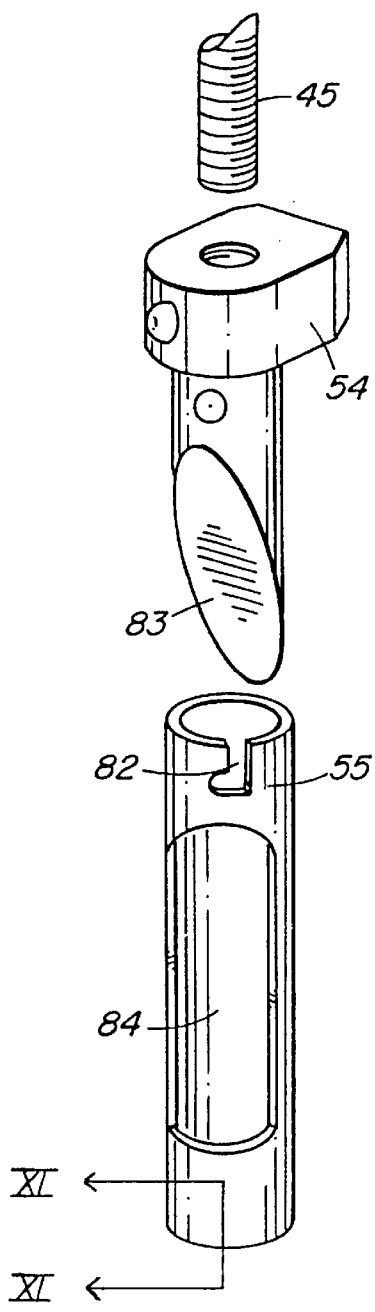
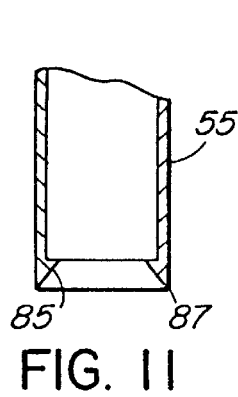
FIG. 11
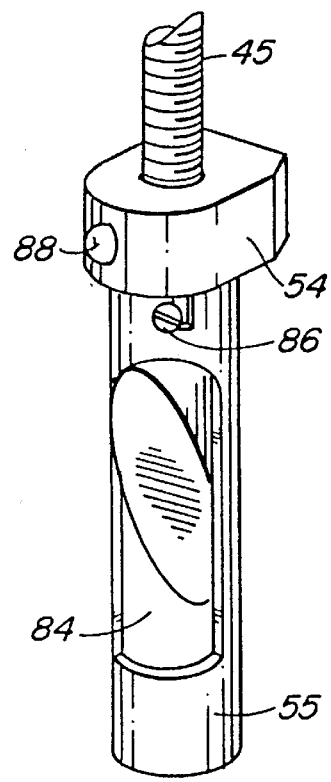
FIG. 12
FIG. 10
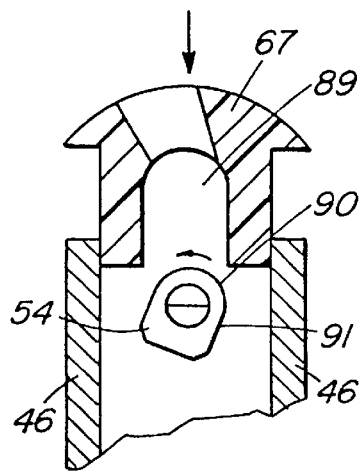
FIG. 13A
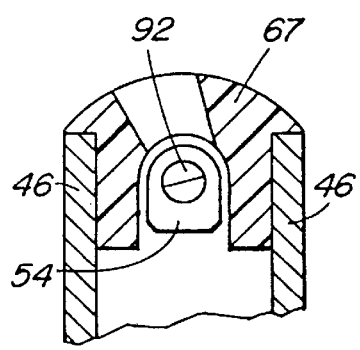
FIG. 13B

HAND TOOL FOR APPLYING ADHESIVE STRIP MATERIAL

BACKGROUND ON THE INVENTION

1. Field of the Invention

This invention relates to an apparatus for applying a flexible adhesive strip around the perimeter edge of a rigid substrate. More particularly, the present invention relates to an improved apparatus for applying an insulating edge strip onto glass sheets as part of the manufacturing process of insulating glass units.

2. Description of the Prior Art

To simplify the production of insulating glass units, various adhesive strip products have been developed. One such product is described in U.S. Pat. No. 4,831,799. The product is manufactured from flexible thermoset rubber foam that incorporates desiccant fill material and features a vapor barrier backing film and acrylic side adhesive. The side adhesive is protected by a flexible release liner that allows the material to be packaged on reels. This adhesive strip product has been commercialized by Edgetech IG Inc., and is marketed under the registered trademark name of SUPER SPACER®.

For the production of insulating glass units, the adhesive strip product is applied around the perimeter edge of a glass substrate. To provide continuity of the vapour barrier at the corners, a notch is made at the corners and this creates a flex point that allows for easy corner formation.

Various application tools have been developed for forming these notched corners and as documented in photographs of a prototype Edgetech application tool, one way of forming these corner notches is through the use of a slidable circular punch. The Edgetech tool incorporates various special features including: strip feeding channel, alignment guide, cylindrical handle, pressure wheel and pneumatic cylinder punch.

When activated, the hollow punch removes a half circular portion or slug of strip material. Because of the acrylic side adhesive, these slugs adhere together and consequently, the slug material can be easily ejected from the tool. As a result, the tool can remain in continuous contact with the glass sheet and the productivity of strip application is improved.

At the final corner, there can be further productivity advantages if the tool can also incorporate a blade for cutting through the adhesive strip. As described in U.S. Pat. No. 5,472,558 issued to Lafond, one approach is to add a separate blade that operates in combination with the punch to both notch and cut through the adhesive strip at the final corner. Although productivity is improved, experience has shown that this simultaneous operation of the punch and cutting blade requires a complicated punch design that is expensive to manufacture and is prone to wear and damage.

Compared to the earlier Edgetech tools, another new feature of the Lafond tool is that both the pneumatic cylinder and strip feeding channel are steeply inclined at angle and this has the advantage of a reduced channel length between the pneumatic cylinder and the pressure wheel. However, the drawback is that after strip cut-off, the tool requires to be rethreaded and this can be a time consuming operation.

The Lafond tool also features a cylindrical handle and a finger trigger for operating the pneumatic cylinder that is located below the handle and operated by means of a finger pulling action. From an ergonomic perspective, and for horizontal strip application using a rotary table, there are three main drawbacks to this arrangement. First, it provides for wrist deviation with rapid finger movement. Second, it combines forceful gripping with a twisting action and third, it requires rapid and forceful pronation with strong elbow and wrist flexion.

SUMMARY OF THE INVENTION

The present invention provides a hand tool for applying adhesive strip material to a substrate having an edge and a major face, comprising: a body having a lower surface, a front face and a channel extending therethrough for receiving the strip material therein; said tool being manually graspable for manipulation thereof and being configured to provide for multiple holding positions; a positioning member adjacent to said channel on said lower surface of said body for guiding said tool along said edge of said substrate; a punch means mounted in said body selectively operable for removing a portion of the strip material; a separate cutting means in said body selectively operable to cut through the strip; a punch actuator on the exterior of said hand tool in a location that is accessible for operation of said actuator by a hand of the user of the hand tool in a plurality of said multiple holding positions.

The cutting means is preferably accessible for manual operation by a hand of the user in a plurality of the aforementioned multiple holding positions. The punch means can be connected for operation by a pneumatic cylinder actuated through a push-action lever bar on the side of the body where it is accessible for operation by a hand of the user in a number of the multiple holding positions.

Preferably the tool includes removable spacers which can be inserted into the channel to adjust the channel width to match the width of the strip that is to be applied. The width of the channel and the distance between the cutter and the front end of the channel are factors in helping retain the leading end of the strip supply within the hand tool after the applied strip has been severed. With this arrangement, since the strip does not have to be rethreaded into the tool before being applied to a subsequent substrate, the productivity of the tool is increased.

The body and handle of the tool are preferably ergonomically shaped for comfort in use and to allow engagement of the tool by multiple and changing hand positions. The punch is preferably selectively operated by the fingers or thumb of the hand in which the tool is held, suitable actuators requiring pushing action from a finger or thumb onto a lever or button.

The components of the hand tool are preferably detachable, the tool having a body to which the components can be attached for use in right handed or left handed mode. The tool includes a removable front face plate which at its lower end incorporates a slot at the top of which is a roller for guiding the strip into the tool channel, the face plate also including a large opening through which slugs cut from the strip by the punch are ejected.

The lower face of the tool is preferably provided as a removable wear plate, and the positioning member as a reversible bar that is releasably attached to the lower surface of the body, these parts being of plastic material which will minimize damage to the substrate.

The pressure wheel is height adjustable preferably by means of a finger-actuated rotatable nut wheel engaging a threaded stem on which the pressure wheel is carried.

BRIEF DESCRIPTION OF DRAWINGS

FIG. 10 is an exploded perspective view of the two part punch assembly of the hand tool.

FIG. 11 is a cross section detail of the punch blade taken on the line XI—XI of FIG. 10.

FIG. 12 is a top perspective view of the two part punch as assembled.

FIG. 13A shows a plan cross section detail of a disassembled front face plate and an out-of-alignment punch.

FIG. 13B shows a plan cross section detail of the assembled front face plate and punch assembly.

DETAILED DESCRIPTION OF THE DRAWINGS

Figure 1:
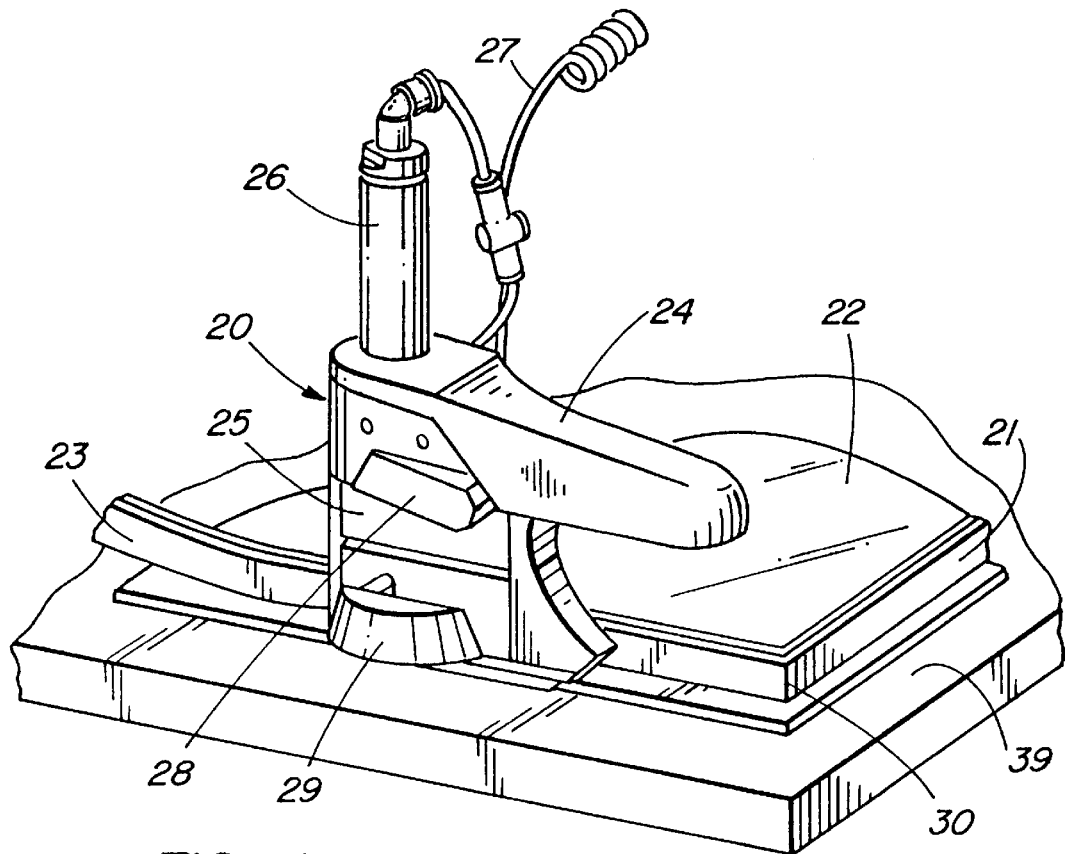
FIG. 1 is a top side rear view perspective view of a hand tool for adhesive strip application on a horizontal work surface and incorporating a punch for corner notching and strip cut-off.

Referring to the drawings, FIG. 1 shows a top perspective view of a hand tool generally represented by numeral 20, that is used to apply a flexible adhesive strip 21, around the perimeter edge of a rigid, horizontally-positioned, glass sheet 22. The adhesive strip 21 is backed by a vapor barrier film 23.

For horizontal application, the glass sheet 22 is typically placed on a horizontal work surface 39 and held in position by a suction cup (not shown). The glass sheet 22 is rotated around through 90° increments and this allows the perimeter edges of the glass sheet to be conveniently located close to the operator.

The hand tool 20 consists of a removable handle 24, a central body portion 25 and a pneumatic cylinder 26. An airline 27 supplies pressurized air to the cylinder 26. As discussed in detail later, the pneumatic cylinder activates a hollow circular punch that removes a semi-circular piece of material known as a slug from the adhesive strip 21. This feature allows the strip 21 to be bent or flexed about a corner 30 and also ensures that the vapor barrier backing 23 of the strip is continuous.

The pneumatic cylinder 26 is activated using a lever bar 28 pivotally mounted on the side of the tool where it is accessible to be operated through a thumb or finger pushing action. As will be described in detail later, the hand tool also features a separate cutting blade that is operated by a push-bar 29 which is also located on the side of the tool to be operated through a thumb and finger action.

Figure 2:
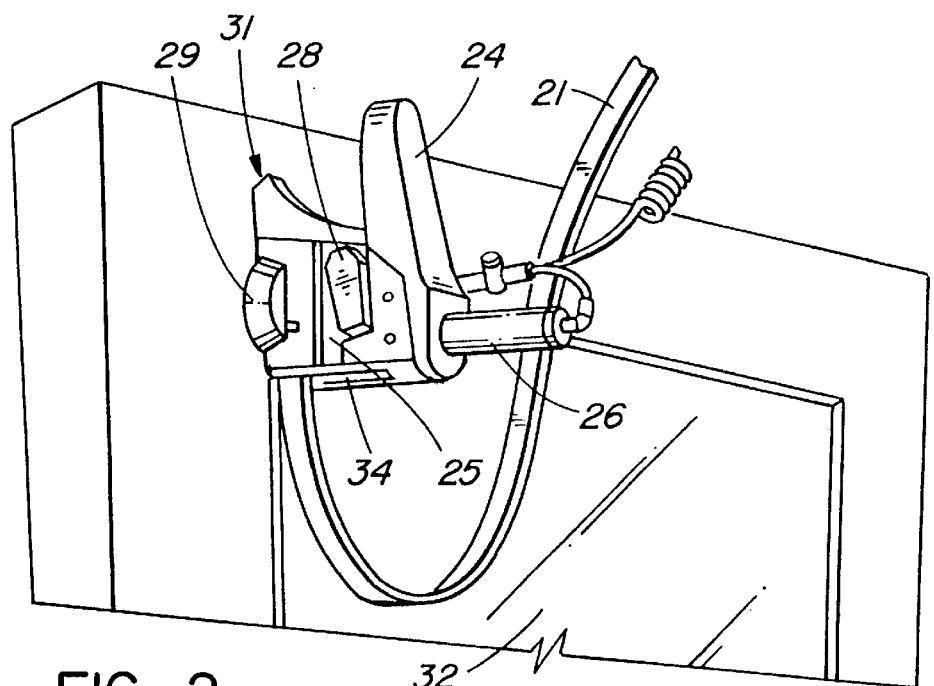
FIG. 2 is a top side front perspective view of a hand tool for adhesive strip application on a vertical work surface.

FIG. 2 shows a hand tool, generally represented by numeral 31, that is used to apply a flexible adhesive strip 21, around the perimeter edge of a vertically-positioned rigid glass sheet 32. For vertical application, the glass sheet 32 is typically placed on a vertical work surface and held in position by suction cups (not shown). In contrast to horizontal application, the glass sheet 32 is not rotated but the glass sheet can be lowered or raised as required.

As with the horizontal application tool 20, the vertical application tool 31 features a removable handle 24, a central body portion 25, and a pneumatic cylinder 26. The vertical application tool 31 also incorporates laterally positioned push-action lever bar 28 and push-bar 29 although it should be noted that in contrast to the horizontal application tool 20, these operating devices are located on the opposite side of the tool.

Figure 3:
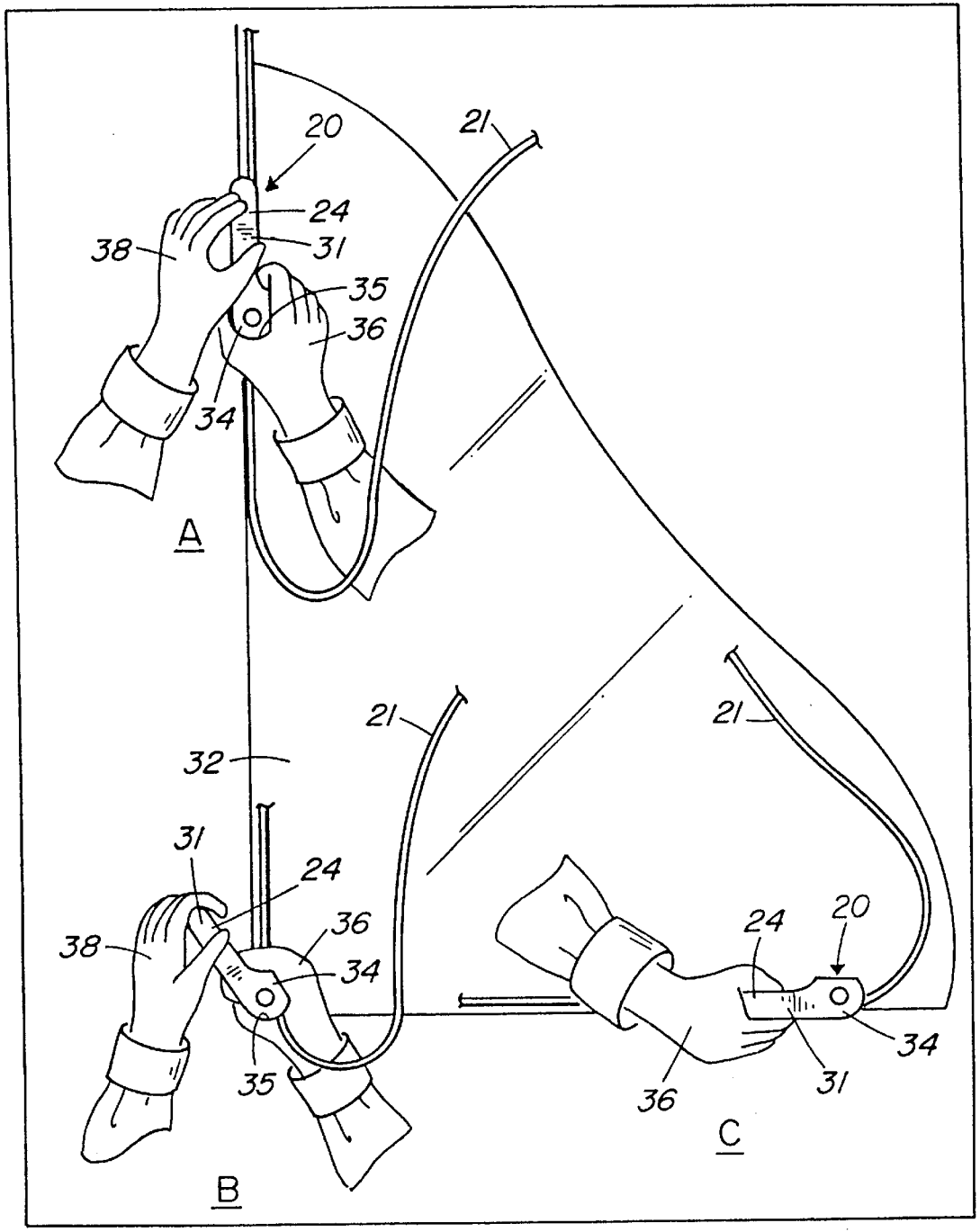
FIG. 3 shows views of tool manipulation at the first corner of adhesive strip application on a vertical work surface.

FIG. 3 shows tool manipulation for adhesive strip application on a vertical work surface. Initially at A, the front face 34 of the tool is held in the palm 35 of the right hand 36. The tool is also partially supported by the left hand 38. As the tool approaches the bottom corner B, the hand positions are readjusted so that when the tool has rounded the corner and is moved horizontally along the lower edge, the tool handle 24 can be held conventionally in the right hand 36. To provide for these multiple hand positions, the front face 34 and handle 24 are ergonomically shaped.

Figure 4:
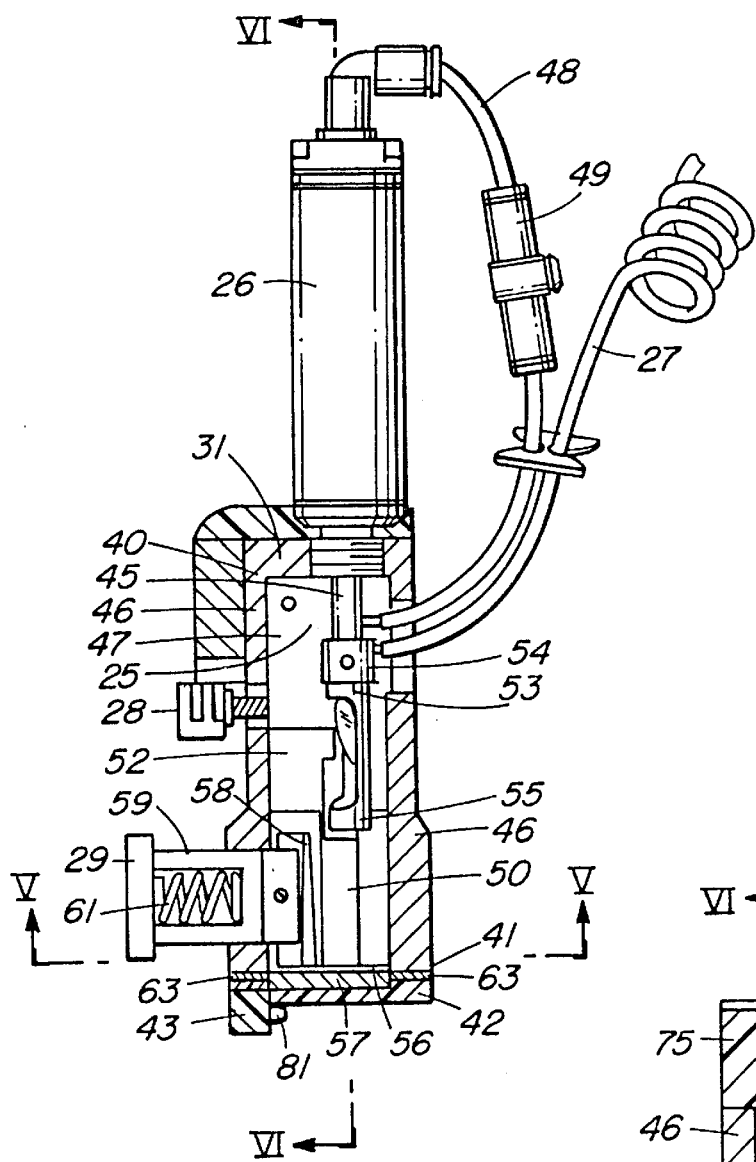
FIG. 4 is a front cross section through the hand tool taken on the line IV—IV in FIG. 5 and line IV—IV in FIG. 6.
Figure 5:
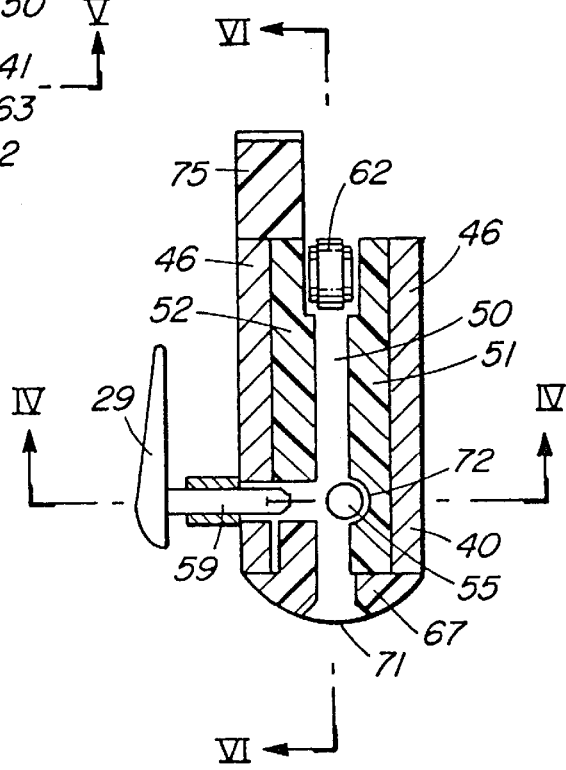
FIG. 5 is a horizontal cross section through the hand tool taken on the line V—V in FIG. 4 and line V—V in FIG. 6.

FIG. 4 shows the hand tool 31 for vertical strip application set for operation by a right-handed person. It should that be noted that although FIG. 4 is drawn as a sectional drawing, key components such as punch assembly are drawn in three dimensional form as this helps explain the product invention. It should also be noted that spacer 51 seen in FIG. 5 is omitted from FIG. 4.

The body 25 is manufactured in part from a U-shaped metal channel 40 and has a lower surface 41. A removable base plate 42 is attached to the U-shaped metal channel 40. To prevent scratching or accidental chipping of the glass sheet, the base plate 42 extends over the entire lower surface 41 and the base plate 42 is also manufactured from a smooth plastic material such as TEFLON (Registered Trademark) polytetrafluorethylene or polyacetal plastic.

An alignment bar 43 is attached to the base plate 42 and extends the length of the lower surface 41. The alignment bar 43 is also manufactured from a smooth, durable plastic that provides for sliding guided contact on the perimeter edge of the glass sheet. Because the plastic alignment bar 43 is subject to extensive wear, the strip is reversible and is also made from a durable plastic material such as polyacetal.

The pneumatic cylinder 26 is located towards the center of the U-shaped channel 40 and this ensures that the tool weight is reasonably balanced so that the tool can be comfortably held in the hand. To provide for multipositional handling of the tool, tubing connections are kept to a minimum and this is achieved by using a spring-return pneumatic cylinder 26. Mounted within the cylinder 26 is a piston that moves back and forth when activated. The air supply line 27 is connected to a rear ported valve 47 that is located between the two side walls 46 of the U-shaped metal channel 40. A lever bar 28 is connected to the valve 47. A second air line 48 connects the valve 47 to the pneumatic air cylinder 26 and this second air line 48 incorporates a pressure relief valve 49 which allows for faster operation of the spring-return pneumatic cylinder 26.

When the tool is in operational use, the adhesive strip passes through a channel 50 located between two plastic spacers 51 and 52 (See FIG. 5). Attached to the piston shaft 45 is a two-piece punch assembly 53 that consists of a punch block 54 and a punch blade 55. When activated, the punch assembly 53 moves vertically downwards to a plastic punch pad 56. To prevent the adhesive strip from adhering to the plastic punch pad 56, the pad is manufactured from low-friction material such as TEFLON.

The plastic punch pad 56 is supported by an interlocking metal support plate 57 that is held firmly in position by means of an indentation within the removable base pad 42 and extending side wings 63 that allow the removable base pad 42 and punch plate 56 to be both screw connected to the side walls 46 of the U-channel 40.

The hollow tubular punch blade 55, when activated at each corner, removes a half circular slug of material from the adhesive strip 21 and at the final corner after the adhesive strip has been notched, the adhesive strip 21 is fully cut through by means of a cutting blade 58 that is attached to a push-over housing 59 and the push-bar 29. For spring-return action, the push-over housing 59 incorporates a metal spring 61.

FIG. 5 shows that the hand tool 31 incorporates a channel 50 that extends from the front edge 71 of a removable front face plate 67 to a pressure wheel 62. To match the width of the channel 50 to that of the adhesive strip, removable plastic spacers 51 and 52 are attached to the side walls 46 of the U-shaped channel 40. To accommodate the punch blade 55, the plastic spacer 51 incorporates a half circular indentation 72.

Figure 6:
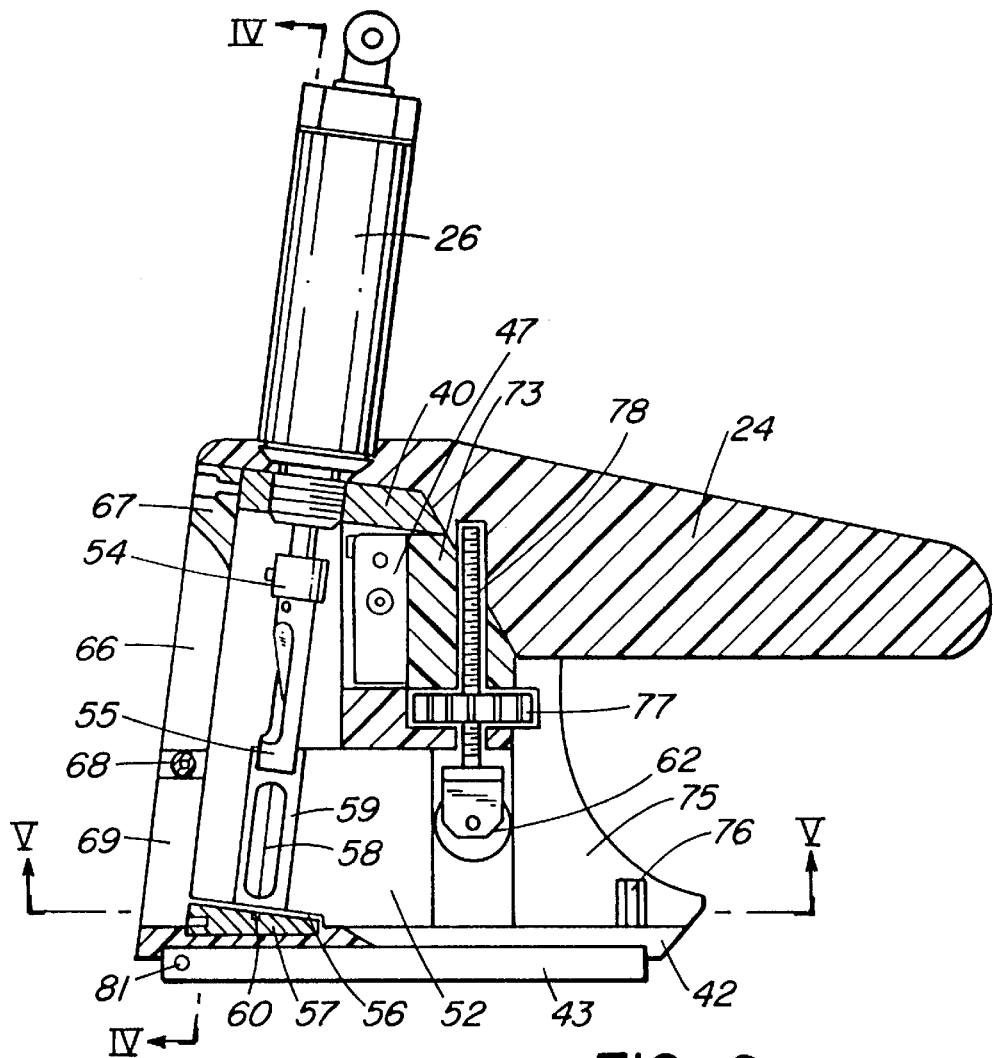
FIG. 6 is a side cross section through the hand tool taken on the line VI—VI in FIG. 4 and line VI—VI in FIG. 5.

FIG. 6 shows a side cross section through hand tool for vertical strip application by a right-handed person. It should be noted that although FIG. 6 is drawn as a cross sectional drawing, key components such as the punch are shown in three dimensional form as this helps explain the product invention.

Attached to U-channel metal channel 40 is a removable front face plate 67. During the corner-notching operation, the punch blade 55 when depressed removes a half-circular slug of material from the adhesive strip. Because of the side adhesive on the strip, the half circular slugs successively removed, adhere together and form a half cylindrical tube that is ejected through a slot 66 in the front face plate 67.

Both the sides of the slot 66 are smoothly contoured and direct the half-circular tube of slug material away from the glass substrate. The front face plate 67 also incorporates a roller 68 that is located between the sides of the slot 66 and which helps to direct and hold down the adhesive strip at the entry point 69. To prevent the roller 68 from sticking to the adhesive strip, the roller 68 is manufactured from TEFLON plastic.

When the tool is in operational use, the adhesive strip passes beneath the roller 68 and through the slot 69 in the front face plate 67. The strip is then guided between the two plastic spacer pieces 51 and 52 (See FIG. 5) and beneath an adjustable pressure wheel 62. The pressure wheel 62 rides on the adhesive strip and ensures that the base pad 42 is not in direct contact with the glass sheet 32.

A removable handle 24 is held in place by a pneumatic cylinder 26 that is screwed into and supported by the U-shaped metal channel 40. The pneumatic cylinder 26 is inclined at a slight angle of 7° and both the punch pad 56 and punch plate 57 are aligned at right angles to the cylinder 26. To allow for the adhesive strip material to be cleanly cut without any tearing of the material, the knife blade 58 is sloped, and also extends below the punch pad 56. To accommodate this larger size knife, the punch plate 57 incorporates a slot 60.

A back support block 75 (See FIG. 6) is attached to the base pad 42 and to the removable handle 24. To provide for the correct start-up position of the hand tool 31 on the vertical glass sheet 32, the support block 75 features alignment lines 76.

Although FIGS. 4 to 6 show cross sections and plans of the hand tool for vertical strip application by a right handed person, it can be appreciated by those skilled in the art that the tool is modular in design and can be easily modified for other operations. The main structural support for the tool is the U-shaped metal channel. By adding on different components such as handles, front face plates, back support plates and punch pieces, the tool operation can be modified from vertical to horizontal application, from right to left-handed use and also for different punch/knife options.

Figure 7:
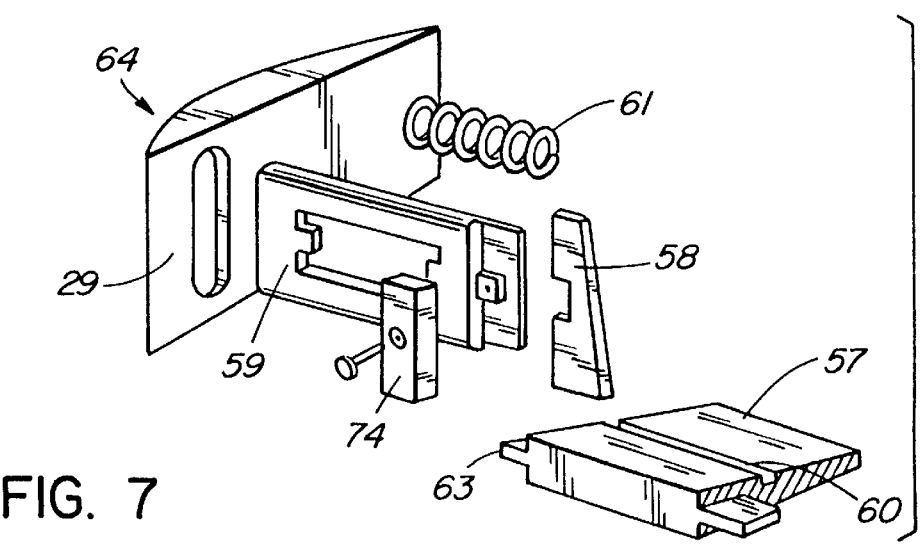
FIG. 7 is an exploded perspective view of the cutting push-over mechanism.

FIG. 7 shows an exploded perspective view of the cutting push-over mechanism 64 that consists of a push bar 29 that is connected to push over housing 59 that incorporates a spring 61. A cutting blade 58 is connected to the push-over housing 59 and held firmly in place by a locking plate 74. The punch plate 57 incorporates side wings 63 that allow the plate to be firmly held in position and screw mounted to the side walls 46 of the U-shaped channel 40. To accommodate the movement of the knife blade 58, the punch plate 57 incorporates a slot 60.

Figure 8:
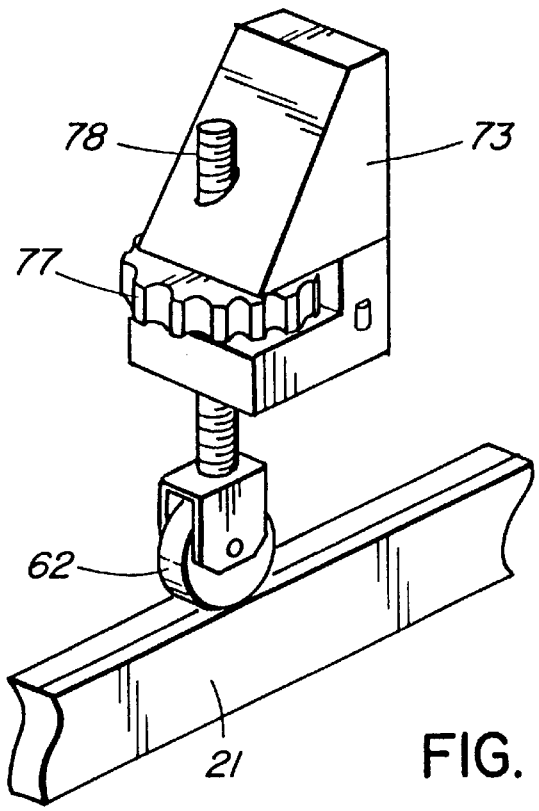
FIG. 8 is a top perspective detail of the adjustable pressure wheel.

FIG. 8 shows a top perspective detail of the adjustable pressure wheel 62. Because varying heights of adhesive strip are used, it is important that the spacing between the pressure wheel 62 and the glass sheet 21 can easily be adjusted and this is achieved through means of a nut in the form of a finger knob 77 that can be rotated through finger action to raise or lower the pressure-wheel threaded shaft 78. To prevent the pressure wheel 62 from sticking to the adhesive strip 21, the wheel is made from Teflon plastic. The plastic support block 73 for the pressure wheel 62 as shown in the perspective detail is attached by screws to the U-shaped aluminum profile 40.

Figure 9:
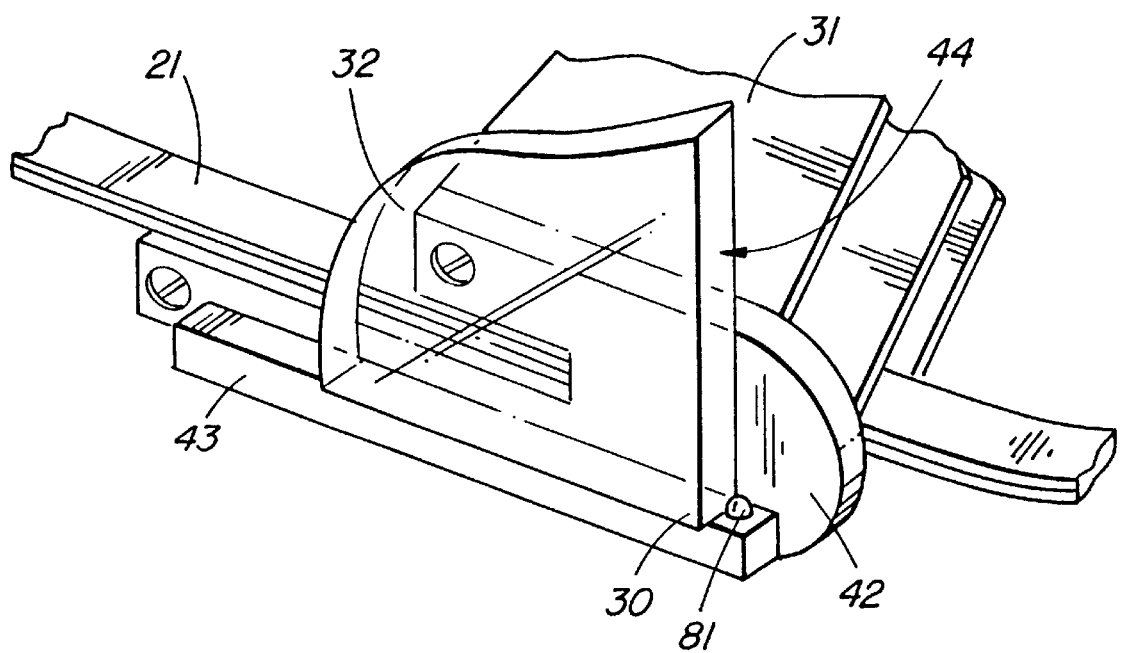
FIG. 9 is a fragmentary bottom perspective view of a corner locator and the lower surface of the hand tool.

FIG. 9 illustrates an optional feature of the hand tool which is a corner locator pin. Typically for corner location, the operator uses alignment lines engraved on the outer side wall surface of the tool (not shown). An alternative approach is to use a corner locator pin 81 which is incorporated within the alignment bar 43. The locator pin 81 which is spring-loaded helps the operator to locate the corner 30 of the glass sheet 32 (i.e. is spring biased to an outwardly projecting position from an inwardly compressed position).

When the tool 31 is in operational use, the spring-activated locator pin 81, pops out after the front end of the alignment bar 43 has passed the corner 30 of the glass sheet 32. The operator can then backtrack the tool a slight distance and hold the corner locator pin 81 firmly against the glass edge 44.

FIG. 10 is an exploded top perspective view of the two-piece punch assembly that consists of a punch block 54 and a punch blade 55. The punch block 54 is a solid metal piece and features a smooth, polished inclined surface 83 that deflects the half cylindrical tube of slug material and allows it to be ejected through an oval slot hole 84 in the punch blade 55.

FIG. 11 is a cross-section detail of the punch blade 55. During the punch operation, the slug material cut by the sharp circular blade 87 is prevented from dropping down and jamming the punch operation through the use of an inclined keen-edged angled barb 85 that is typically angled at 30° (60° included).

FIG. 12 is top perspective view of the two piece punch as assembled. The punch blade 55 is attached to the punch block 54 using a metal screw 86 which passes through a slot 82 at the upper end of the punch blade 55. The punch block 54 is typically manufactured from a solid steel piece while the punch blade 55 is manufactured from a tubular steel profile that provides for a smooth interior bore and minimum frictional resistance to the passage of the slug material. To prevent the slug material from jamming in the punch blade 55, the longitudinal oval opening 84 is made as large as possible and to further reduce friction resistance, the interior tube surface can be coated with a lubricant coating such as NIFLOR (Registered Trademark).

To help ensure that the blade edge 85 remains keen edged, the punch blade 55 can be manufactured from special steel alloys. The blade edge 85 can also be specially hardened but the body of the punch blade 55 is generally not treated because of the need for shatter resistance due to the large oval opening 84. The two piece punch assembly is attached to the piston shaft 45 by a screw 88.

Compared to a single-piece punch, some of the main advantages of the two-piece assembly, include: (i) reduced maintenance costs because only the tubular punch blade has to be replaced when worn, and (ii) reduced set-up time as the punch blade when replaced is always correctly aligned.

FIG. 13A shows a plan cross section detail of a disassembled front face plate 67 and a punch block 54 that is out-of-alignment. The punch block 54 features a curved front face 90 and parallel side walls 91. The front face plate 67 incorporates a slot groove 89 with a corresponding profile to the punch block 54. As the front face plate 67 is pushed into the side walls 46 of the U-shaped channel 40, the punch block 54 is re-aligned correctly (see direction of arrow).

FIG. 13B shows a plan cross section detail of the assembled front face plate 67 and punch block 54. The punch block 54 is tightly held by the front face plate 67 and this ensures that the slug guide 92 is correctly aligned and that the slug material is cleanly ejected.

FIGS. 14 to 17 show the sequence of operations between final corner cut-off of the adhesive strip on a glass sheet and the first corner application of the adhesive strip on a second glass sheet.

Figure 14:
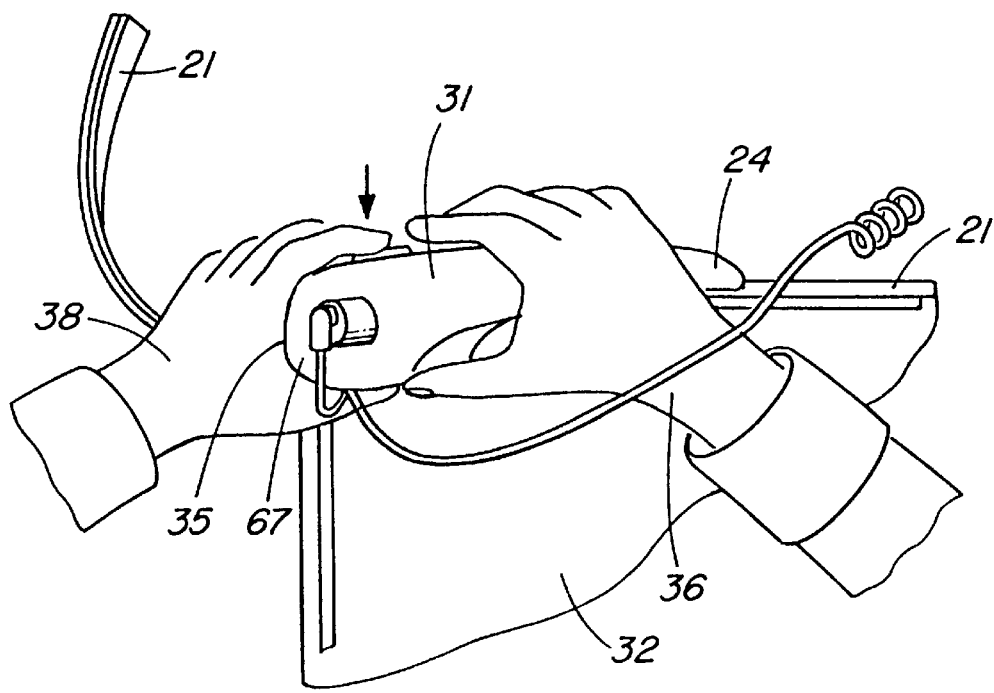
FIG. 14 shows the tool positioned for final cutoff of the adhesive strip with the glass located in a vertical position.

FIG. 14 shows a top perspective view of the final cut-off of the adhesive strip 21 with the glass sheet 32 located in a vertical position. The handle 24 of the hand tool 31 is held in the right hand 36 of the operator and palm 35 of the left hand 38 grasps the bottom part of the front plate 67 with the fingers on the push bar and the thumb on the opposite side of the hand tool. Using the corner locator 81 (see FIG. 9), the hand tool 31 is correctly positioned for final spacer cut-off. The final corner notch is made and the adhesive strip is then cut through by applying clamping pressure between the thumb and fingers to press the push bar 29 laterally to actuate the knife 58.

Figure 15:
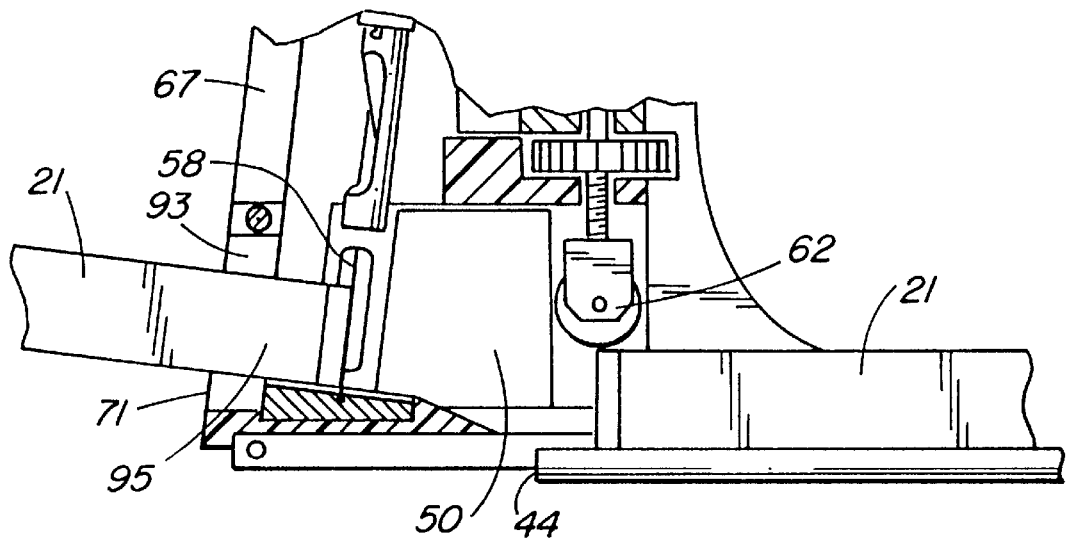
FIG. 15 shows a side cross section detail of the hand tool following final cutoff of the adhesive strip.

FIG. 15 shows a side cross-section detail of the hand tool 31 following final cut-off of the adhesive strip 21. As the hand tool 31 advances past the glass edge 44, the adhesive strip 21 is held within the front part 93 of the channel 50. The adhesive strip is held in position partly because the cutting blade 58 is located at least 15 mm from the front edge 71 of the face plate 67, and partly because the width of the channel 50 is only slightly larger than the adhesive strip 21.

Figure 16:
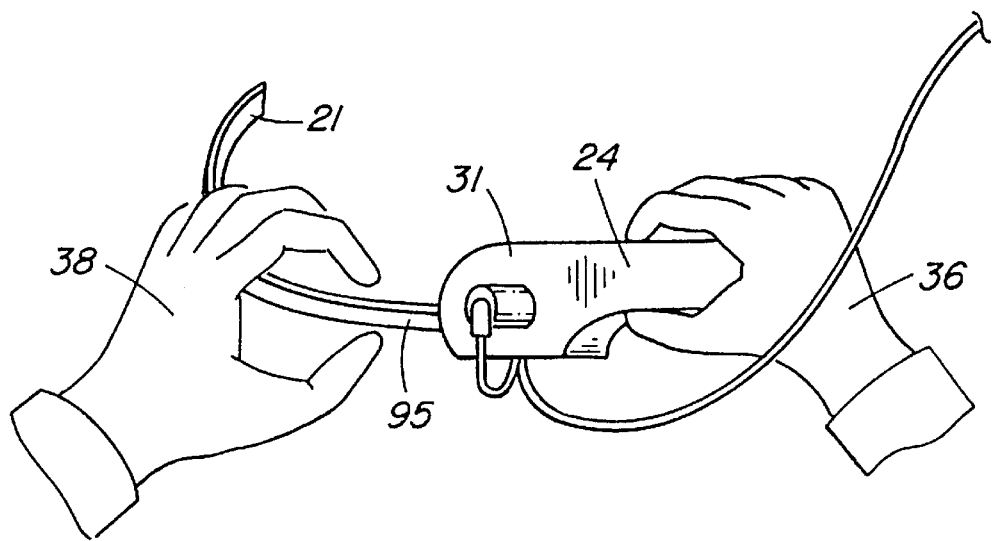
FIG. 16 shows the adhesive strip being advanced within the hand tool following final cutoff.

FIG. 16 shows a top perspective view of the hand tool 31 following the final cut-off of the adhesive strip 21. The free end 95 of the adhesive strip 21 is held within the hand tool so that the adhesive strip 21 can be readily grasped-in the fingers of the left hand 38 and simply advanced by a pushing action.

Figure 17:
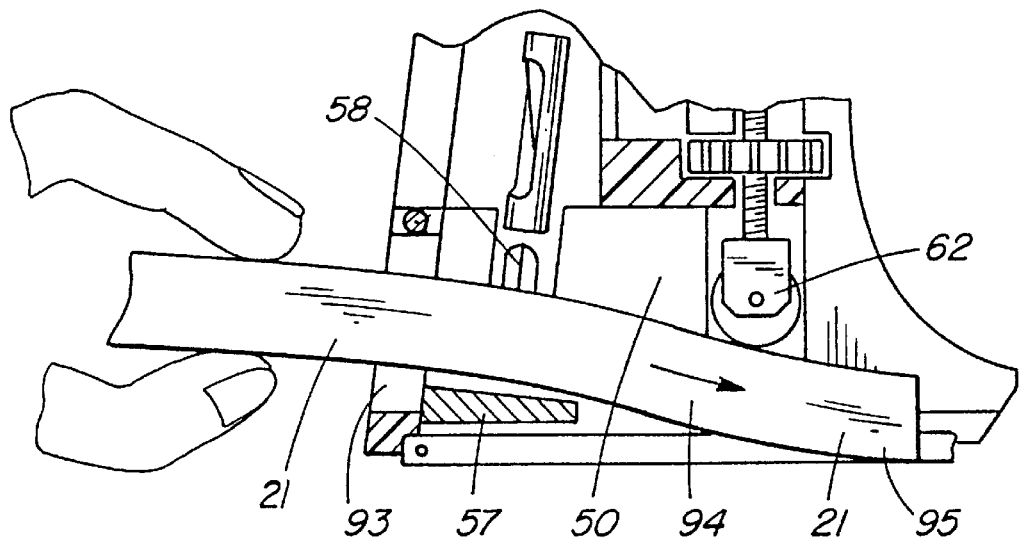
FIG. 17 shows a side cross section detail of the hand tool following the advancement of the adhesive strip.

FIG. 17 shows a side cross section of the hand tool following the advancement of the adhesive strip 21 through the channel 50. The adhesive strip is held firmly within the channel 50 and this is partly because the removable spacers 51 and 52 (not shown), ensure that the width of the channel 50 is only slightly larger than the width of the adhesive strip 21 and also partly because of the long length of the back part 94 of channel 50. Specifically, the center line of the pressure wheel 62 is located at least 35 mm from the cutting blade 58 and the front part 93 and back part 94 combined create a total channel length of about 60 mm.

After the final corner cut-off, because of the adhesive strip 21 is firmly held within the channel 50, there is no need to rethread the adhesive strip and as a result, productivity is improved. It should also be noted that because the pressure wheel 62 is located at least 35 mm from the cutting blade 58, the optimum inclined angle of the punch plate 57 is very slight and is about 7°.

In FIGS. 1 to 17 when describing the product inventions, specific reference is made to the adhesive strip product, SUPER SPACER®, manufactured by Edgetech I.G. Inc. Although the equipment has been specifically developed for this product, it should be apparent to those skilled in the art that the inventions described have wide application and are not limited to this particular adhesive strip product.

What is claimed is:

1. A hand tool for applying adhesive strip material to a substrate having an edge and a major face, comprising:
   a body having a lower surface, a front face and a channel extending therethrough for receiving the strip material therein;
   said tool being manually graspable by a hand of a user for manipulation of said tool, and being configured to provide for multiple holding positions by the hand of the user;
   a positioning member adjacent to said channel on said lower surface of said body for guiding said tool along the edge of the substrate;
   a punch mounted in said body selectively operable for removing a portion of the strip material;
   a separate cutter in said body selectively operable to cut through the strip material; and
   a punch actuator on an exterior lateral side of said hand tool in a location that is readily accessible for operation of said actuator by the hand of the user of the hand tool in a plurality of said multiple holding position; and
   wherein said body incorporates removable spacers insertable in said channel to permit the width of said channel to be adapted to match the width of the strip material.

2. The hand tool of claim 1, wherein a cutter actuator is accessible on an exterior lateral side of said hand tool for manual operation thereof by the hand of the user in a plurality of said multiple holding positions.

3. The hand tool of claim 1 further comprising a pneumatic cylinder operably connected to operate said punch, and wherein said punch actuator comprises a push-action lever bar on said lateral side of said body for actuating said punch via said pneumatic cylinder.

4. The hand tool of claim 1, including a pressure wheel in said body to the rear of said punch and positioned to ride on the strip material and press it onto the substrate, wherein said pressure wheel is height adjustable through a finger controlled adjuster.

5. The hand tool of claim 1 further comprising a pneumatic cylinder operable to power said punch upon operation of said punch actuator; and wherein said body is fabricated in pat from a U-shaped profile and includes a removable handle that is attached to said body and held in position by said pneumatic cylinder.

6. A hand tool for applying adhesive strip material to a substrate having an edge and a major face, comprising:

a body having a lower surface, a front ice and a channel extending therethrough for receiving the strip material therein;

said tool being manually graspable by a hand of a user for manipulation of said tool, and being configured to provide for multiple holding positions by the hand of the user;

a positioning member adjacent to said channel on said lower surface of said body for guiding said tool along the edge of the substrate;

a punch mounted in said body selectively operable for removing a portion of the strip material;

a separate cutter in said body selectively operable to cat through the strip material; and a punch actuator on an exterior lateral side of said hand tool in a location that is readily accessible for operation of said actuator by the hand of the user of the hand tool in a plurality of said multiple holding position; and a pneumatic cylinder operable to power said punch upon operation of said punch actuator;

wherein said body is fabricated in part from a U-shaped profile and includes a removable handle that is attached to said body and held in position by said pneumatic cylinder.

7. The hand tool of claim 6 wherein a cutter actuator is accessible on an exterior lateral side of said hand tool for manual operation thereof by the hand of the user in a plurality of said multiple holding positions.

8. The hand tool of claim 6 wherein said punch actuator comprises a push-action lever bar on said lateral side of said body.

9. The hand tool of claim 6 including a pressure wheel in said body to the rear of said punch and positioned to ride on the strip material and press it onto the substrate, wherein said pressure wheel is height adjustable through a finger controlled adjuster.

10. A hand tool for applying adhesive strip material to a substrate having an edge and a major face, comprising:

a body having a lower surface, a front face and a channel extending therethrough for receiving the strip material therein;

said tool being manually graspable by a hand of a user for manipulation of said tool, and being configured to provide for multiple holding positions by the hand of the user;

a positioning member adjacent to said channel on said lower surface of said body for guiding said tool along the edge of the substrate;

a punch mounted in said body selectively operable for removing a portion of the strip material;

a separate cutter in said body selectively operable to cut through the strip material; and a punch actuator on an exterior lateral side of said hand tool in a location that is readily accessible for operation of said actuator by the hand of the user of the hand tool in a plurality of said multiple holding position; and wherein said positioning member is a reversible plastic pad releasably attached to said lower surface of said body.

11. The hand tool of claim 10 wherein a cutter actuator is accessible on an exterior lateral side of said hand tool for manual operation thereof by the hand of the user in a plurality of said multiple holding positions.

12. The hand tool of claim 10 further comprising a pneumatic cylinder operably connected to operate said punch, and wherein said punch actuator comprises a push-action lever bar on said lateral side of said body for actuating said punch via said pneumatic cylinder.

13. The hand tool of claim 10 further comprising a pneumatic cylinder operable to power said punch upon operation of said punch actuator; and wherein said body is fabricated in part from a U-shaped profile and includes a removable handle that is attached to said body and held in position by said pneumatic cylinder.

14. The hand tool of claim 10 including a pressure wheel in said body to the rear of said punch and positioned to ride on the strip material and press it onto the substrate, wherein said pressure wheel is height adjustable through a finger controlled adjuster.

15. A hand tool for applying adhesive strip material to a substrate having an edge and a major face, comprising:

a body having a lower surface, a front face and a channel extending therethrough for receiving the strip material therein;

said tool being manually graspable by a hand of a user for manipulation of said tool, and being configured to provide for multiple holding positions by the hand of the user;

a positioning member adjacent to said channel on said lower surface of said body for guiding said tool along the edge of the substrate;

a punch mounted in said body selectively operable for removing a portion of the strip material;

a separate cutter in said body selectively operable to cut through the strip material; and a punch actuator on an exterior lateral side of said hand tool in a location that is readily accessible for operation of said actuator by the hand of the user of the hand tool in a plurality of said multiple holding position;

wherein said cutter comprises a blade guided in said body for movement perpendicular both to said channel and to said punch; and wherein a punch plate is provided that spans the underside of said channel in register with said punch, wherein said punch plate incorporates a slot for guiding said blade.

16. The hand tool of claim 15 further comprising a pneumatic cylinder operable to power said punch upon operation of said punch actuator; and wherein said body is fabricated in part from a U-shaped profile and includes a removable handle that is attached to said body and held in position by said pneumatic cylinder.

17. A hand tool for applying adhesive strip material to a substrate having an edge and a major face, comprising:

a body having a lower surface, a front face and a channel extending therethrough for receiving the strip material therein;

said tool being manually graspable by a hand of a user for manipulation of said tool, and being configured to provide for multiple holding positions by the hand of the user;

a positioning member adjacent to said channel on said lower surface of said body for guiding said tool along the edge of the substrate;

a punch mounted in said body selectively operable for removing a portion of the strip material;

a separate cutter in said body selectively operable to cut through the strip material; and a punch actuator on an exterior lateral side of said hand tool in a location that is readily accessible for operation of said actuator by the hand of the user of the hand tool in a plurality of said multiple holding position; and wherein a removable front face plate is attached to said body, said face plate incorporating a slug ejection slot; and wherein said punch incorporates a punch block having parallel sides, said front face plate incorporating a slot groove having spaced sides between which said parallel sides are received to locate said punch in angular registration with respect to said slot.

* * * * *

UNITED STATES PATENT AND TRADEMARK OFFICE
CERTIFICATE OF CORRECTION

PATENT NO. : 6,138,735
DATED : October 31, 2000
INVENTOR(S) : Stephen FIELD et al.

It is certified that error appears in the above-identified patent and that said Letters Patent is hereby corrected as shown below:

In the claims:

column 9, line 1, "pat" should read --part--;

column 9, line 6, "ice" should read --face--; and column 9, line 20, "cat" should read --cut--.

Signed and Sealed this

Fifteenth Day of May, 2001

Attest:

NICHOLAS P. GODICI

Attesting Officer     Acting Director of the United States Patent and Trademark Office